(12) United States Patent
Plunkett

(10) Patent No.: US 7,596,756 B2
(45) Date of Patent: Sep. 29, 2009

(54) BROWSER SESSION CONTROL SYSTEM AND METHOD

(75) Inventor: Mark Plunkett, Oronoco, MN (US)

(73) Assignee: Vacava Inc., Rochester, MN (US)

( * ) Notice: Subject to any disclaimer, the term of this patent is extended or adjusted under 35 U.S.C. 154(b) by 313 days.

(21) Appl. No.: 11/639,383

(22) Filed: Dec. 14, 2006

(65) Prior Publication Data
US 2007/0156384 A1    Jul. 5, 2007

Related U.S. Application Data

(60) Provisional application No. 60/750,288, filed on Dec. 14, 2005.

(51) Int. Cl.
  *G06F 15/00*   (2006.01)
  *G06F 13/00*   (2006.01)

(52) U.S. Cl. ...................... 715/738; 715/744

(58) Field of Classification Search ............... 715/717, 715/740, 763–765, 744, 738, 781, 853, 205; 709/203, 229
See application file for complete search history.

(56) References Cited

U.S. PATENT DOCUMENTS

| 2002/0097268 | A1* | 7/2002 | Dunn et al. ........... 345/760 |
| 2005/0188051 | A1* | 8/2005 | Sneh ................. 709/213 |
| 2007/0180447 | A1* | 8/2007 | Mazzaferri et al. ...... 718/1 |

* cited by examiner

*Primary Examiner*—Cao (Kevin) Nguyen
(74) *Attorney, Agent, or Firm*—Dorsey & Whitney LLP

(57) ABSTRACT

The present invention provides a system and method for controlling a web browser session. A system for controlling a web browser session comprises an emulating engine for automatic control of a web browser session by processing a script. The system further comprises a controlling engine for receiving a plurality of scripts and managing the distribution of the scripts to several emulating engines. A method for controlling a web browser session comprises providing a controller for receiving a script comprising unique tags and managing the script, including assigning the script to an emulator. The emulator then processes the script.

16 Claims, 6 Drawing Sheets

BROWSER SESSION CONTROL SYSTEM AND METHOD

CROSS-REFERENCE TO RELATED APPLICATION(S)

This application claims priority to U.S. provisional patent application Ser. No. 60/750,288, filed Dec. 14, 2005, which is incorporated herein by reference in its entirety.

FIELD OF THE INVENTION

The present invention relates to a system and method for controlling a web browser session, and more particularly to a system and method for intelligently and automatically controlling a web browser session by processing a script that directs the web browser to perform specified actions.

BACKGROUND OF THE INVENTION

As the Internet becomes available to a larger number of users, more tasks can be accomplished on-line. Tasks such as data entry, creating purchase orders, requesting price quotes, requesting catalogs, brochures, or parts lists, setting up customer accounts, making reservations, etc., have become increasingly common behavior for users of the Internet. Having the ability to electronically perform such tasks, and often receive instant responses, has positively affected business worldwide.

However, these tasks become repetitive and time consuming where a provider of goods and/or services needs to periodically place orders, set up customer accounts, request price quotes or parts lists, etc. A data entry specialist or other representative of the business is required to manually navigate through the website, often times involving several web pages, and manually enter the information in the appropriate locations of the website.

There is a need in the art for relieving the data entry specialist or other users of the Internet from being required to manually perform repetitive and tedious electronic tasks. Particularly, there is a need in the art for a system and method of intelligently and automatically controlling a web browser session.

BRIEF SUMMARY OF THE INVENTION

The present invention, in one embodiment, is a method for controlling a web browser session. The method comprises providing a controller for receiving a script comprising a plurality of unique tags and managing the script, including assigning the script to an emulator. The emulator then processes the script. Managing the script may further include providing a queue for holding and managing a plurality of scripts that are received by the controller. The controller may receive several scripts and may assign the scripts to one of several emulators that may concurrently process scripts. The controller may further determine the order in which scripts are assigned to the emulators. The order may be based on whether a website specified by the script is valid, available, or accessible. The emulator generally processes the script by processing the unique tags provided in the script. Typically, the processing includes opening a web browser, loading a specified website, processing the unique tags at the website, and sending a response to a specified location. Additionally, the emulator may access operating system controls, such as window handle information.

The present invention, in another embodiment, is a method for automatic web browser control. The method comprises creating a script of instructions and providing the script to a controlling system with the ability to manage a plurality of scripts. The script is assigned to a browser control engine for processing a plurality of tags contained in the script. A response may be sent to a location specified by the script.

The present invention, in another embodiment, is a system for intelligent control of a web browser session. The system comprises at least one emulating engine for automatic control of a web browser session by processing a script. The system further comprises a controlling engine for receiving a plurality of scripts and managing the distribution of the scripts to the emulating engines. The system may also include a requesting server/workstation and an interface server/workstation. The interface server/workstation generally comprises the emulating and controlling engines. The requesting server/workstation may create the scripts for sending to the controlling engine. The requesting server/workstation may select from several script templates available to create the scripts. The emulating engine may further have a queue for holding a plurality of scripts that will be processed by the emulating engine. Similarly, the controlling engine may have a queue for holding a plurality of scripts for distributing to the emulating engines.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION

Figure 1:
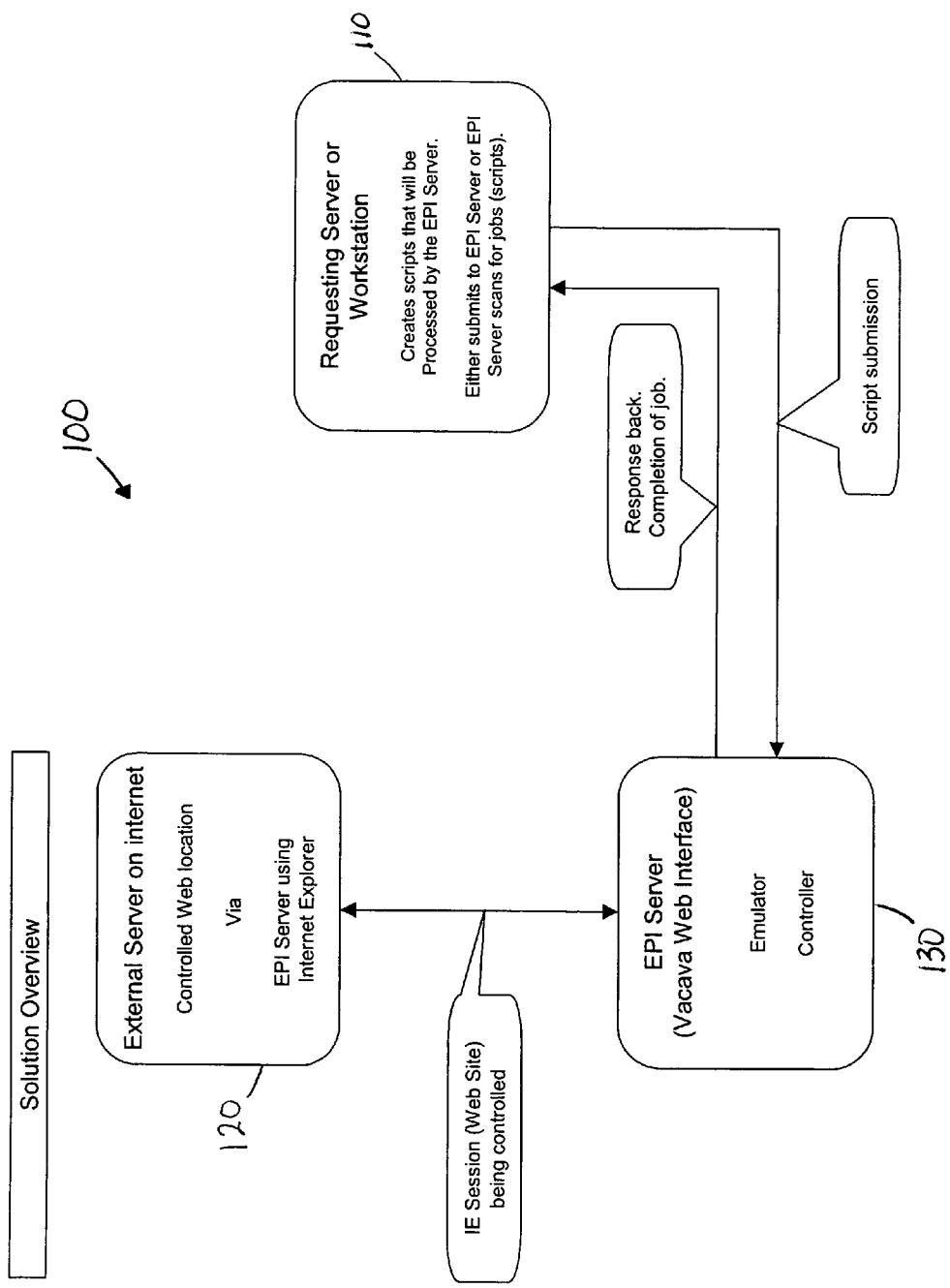
FIG. 1 is a schematic representation of an overview of one embodiment of a browser control system and method of the present invention.

The present invention is a novel and advantageous system and method for the intelligent control of a web browser session. The present invention may be described herein in terms of functional block components and various processing steps. It should be appreciated that such functional blocks may be realized by any number of hardware and software components configured to perform the specified functions. It should be appreciated that the particular implementations shown and described herein are illustrative of the invention and its best mode and are not intended to otherwise limit the scope of the invention in any way. Furthermore, the connecting lines shown in the various figures contained herein are intended to represent exemplary functional or physical relationships between the various elements. It should be noted that many alternative or additional functional or physical relationships may be present in a practical embodiment.

The system and method for the intelligent control of a web browser session includes creating a script having unique tags and sending the script to an interface engine for processing. The script generally contains instructions for performing a task at a specified website or Internet location. Some tasks which can be performed by processing a script include data entry, creating purchase orders, requesting price quotes, requesting catalogs, brochures, or parts lists, setting up customer accounts, making reservations, etc. It shall be recognized that any task that can be completed at a website or Internet location is contemplated by the system and method of the present invention. The interface engine comprises a controller and emulator which together manage and process the script. The controller manages a plurality of scripts and assigns each of them to one of a plurality of emulators. Typically, a plurality of scripts may be processed simultaneously using a plurality of emulators. The script is processed by scanning or reading the unique tags and performing the function corresponding to that particular tag. Some tags may hold information, e.g., script ID, for use by the emulator while other tags may instruct the emulator to perform a specific function, e.g., start up a browser session. Once the script has been processed and the specified task has been performed at the specified website, a response may be sent to a location that is identified by the script. The response that is sent back may include any appropriate information relating to the particular task that was performed, such as an order number or price quote.

Generally, the system and method for the intelligent control of a web browser session can be used to perform several types of repetitive tasks. Similarly, the system and method may be used for performing tasks that will only be infrequently requested, including those that may be requested only once. An example of use for the system and method of the present invention includes customer order entry. The system and method of the present invention could automatically create a script and place an order for every customer purchase request. Although an example is provided for customer order entry, it is recognized that there are several uses for the system and method of the present invention, including other types of data entry.

System Overview

FIG. 1 is a schematic representation of an intelligent and automatic web browser control system 100. System 100 generally comprises requesting server or requesting workstation 110, host server or host workstation 120, and interface server or interface workstation 130. Requesting server 110, host server 120, and interface server 130 may be the same server or workstation, three separate servers or workstations, or any combination thereof. For simplification, requesting server 110, host server 120, and interface server 130 will be described as separate servers or workstations.

Requesting server 110 creates a script that will be processed by interface server 130. A script contains executable program code, or a set of instructions, that when executed, will direct a web browser to perform certain actions at a specified website, hereinafter referred to as a controlling website. The script may be created with unique tags that direct the actions. These actions may include, for example, but are not limited to, simulating pressing a button, filling in text fields, responding to dialog boxes and alerts produced by the browser session, making selections in a table, obtaining table information, downloading or uploading files, making comparison of text on a web page, logging in using a user ID and/or password, redirecting the opening of a browser window caused by an action in a current browser window, simulating key strokes, etc.

A script is created using a script template and user data. A script template comprises the basic set of instructions for navigating through a website and performing the desired action or actions. A script template may be created in one of several manners, including manually or automatically. For example, a user can manually navigate through a website to determine the necessary steps for performing a desired action at that website, e.g., placing an order for an item at the website maintained by a manufacturer or retailer of that item. The user can then manually create a script template for that action based on the steps that were necessary for the user to complete. Alternatively, a script may be generated automatically, such as by a program designed for that purpose. A script template might not contain any of the user data, e.g., customer information, item number, etc., necessary to complete the desired action or actions to be performed at the controlling website. A script template need only be created once and may be reused whenever it is desired to perform the same task, e.g., periodic price quotes. As will be recognized, a script template can be created for any number of tasks resulting in a plurality of available script templates.

Requesting server 110 will create a completed script by placing specified user data in one of a plurality of available script templates, depending on what task needs to be performed. One embodiment of a completed script is illustrated in Appendix A. Appendix A illustrates an exemplary completed script and is not meant to be limiting in any way. It shall be recognized that further embodiments of a completed script may be used with the browser control system of the present invention.

A completed script is submitted, or sent, to interface server 130. Alternatively, interface server 130 scans requesting server 110 for completed scripts and retrieves them from requesting server 110. Interface server 130 processes the scripts, as will be described, and uses a web browser session, e.g., Internet Explorer, to complete the instructions specified in the script.

Host server 120 is the server location of the controlling website where the task specified by the script, and processed by interface server 130, is performed. As previously mentioned, host server 120 may be the same as requesting server 110 and/or interface server 130. Alternatively, host server 120 may be entirely separate and unrelated to either requesting server 110 or interface server 130.

When the task has been completed, interface server 130 may send a response to requesting server 110 acknowledging that the action has been completed. Alternatively, no response that the action has been completed is necessary. Similarly, a confirming response may be sent from interface server 130 to a server or third-party location other than requesting server 110. Furthermore, the script processed by interface server 130 may dictate where the response is to be sent. Information other than a confirming response, such as order number, price total, password, etc., may be sent in addition to, or in lieu of, the confirming response.

Interface Server

Interface server 130, in one embodiment, comprises a controller and an emulator. Alternatively, any number and combination of controllers and emulators may be used with the browser control system and method of the present invention.

Figure 2:
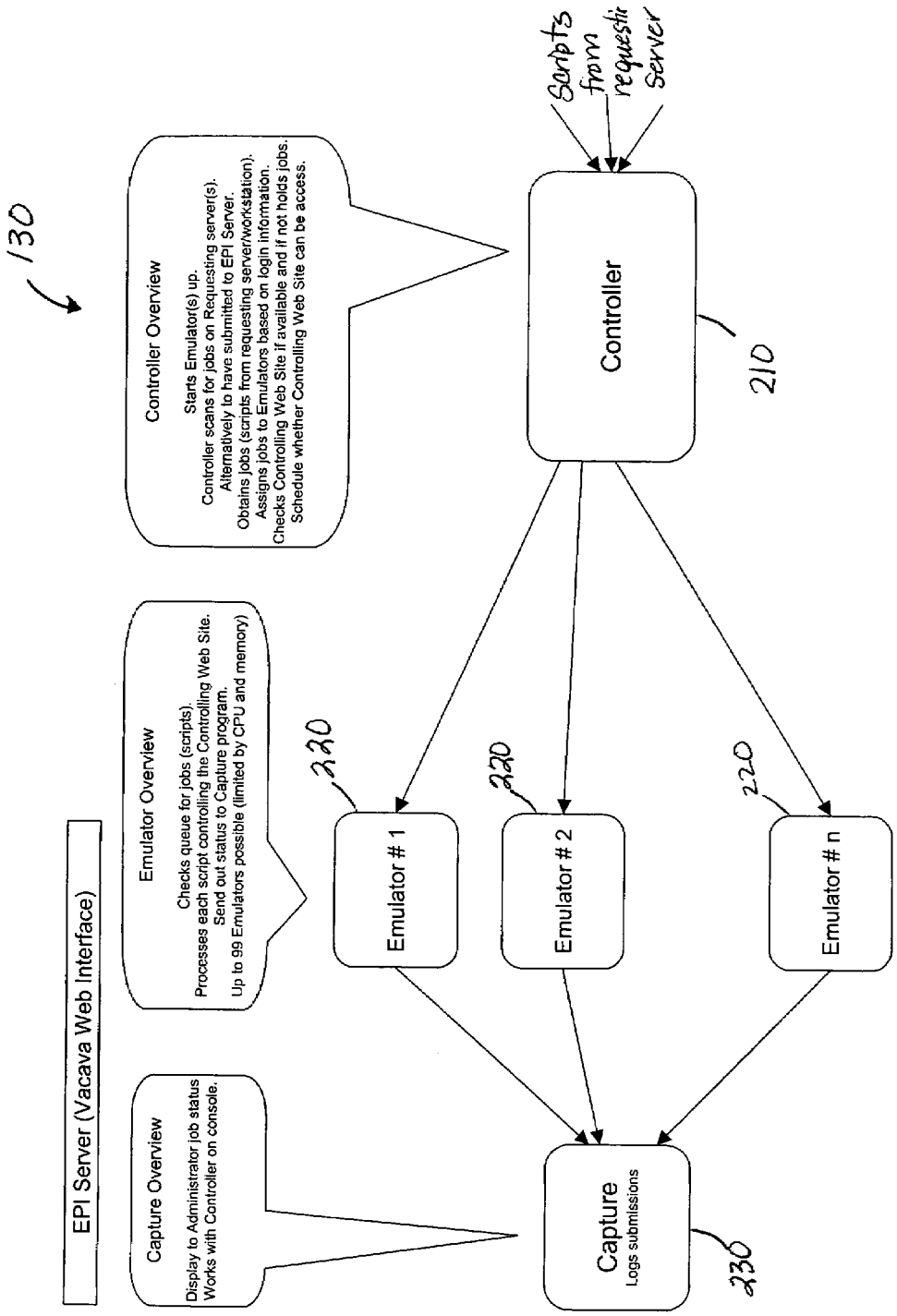
FIG. 2 is a schematic representation of one embodiment of an interface server in accordance with the browser control system and method of the present invention.

In the embodiment illustrated in FIG. 2, one controller 210 and a plurality of emulators 220 are used. In one embodiment, up to ninety-nine emulators are possible. However, it shall be recognized that a fewer or greater number of emulators may be possible in some embodiments of interface server 130. The number of controllers and emulators that are used are generally limited by the central processing unit ("CPU") and memory of interface server 130.

Although controller 210 and emulator 220 will be described in further detail below, generally, controller 210 receives or retrieves one or more completed scripts created by requesting server 110. Controller 210 assigns each script to an emulator 220. Controller 210 may assign a script to an emulator 220 that is currently running or may start up a new emulator 220 for the purpose of processing that script. Emulator 220 subsequently processes the script. Several emulators 220 may each process a separate script concurrently.

In another embodiment, emulator 220 may provide status information relating to the processing of a script. Status information may be provided to capture program 230. Capture program 230, in one embodiment, captures and logs messages from emulator 220. Messages that may be captured and logged include, but are not limited to, when processing of a script starts and ends (e.g., date and time) and the percentage of processing completed. A start message may include an identification of the script (e.g., script ID), what type of script is being processed, who submitted the script, the login ID of the controlling website, and which emulator 220 is processing the script. An end message may include a completion code. The progress of the processing of the script (typically provided as a percentage of completion) may be dynamically updated in real time. Capture program 230 may further display the status information to an interface server administrator. In one embodiment, capture program 230 displays all, or portions of, the data received from emulator 220 in a table such that the user can scroll through the data, print the data, search the data, etc.

Controller

Generally, controller 210 manages how, when, and where completed scripts are obtained. Controller 210 communicates with requesting server 110 to receive, or otherwise obtain, scripts created by requesting server 110. Controller 210 manages the scripts received by placing each script received in one of a plurality of queues for processing by an emulator 220. Controller 210 provides a method for holding off, or waiting on, the assigning and processing of a script when a controlling website is not active or is otherwise invalid or unavailable. Exemplary programming code for one embodiment of a controller of the browser control system and method of the present invention is illustrated in Appendix B. It shall be recognized that a controller may be programmed in several ways, and the programming code in Appendix B is for illustration purposes only and is not limiting. A detailed embodiment of controller 210 is described with reference to FIG. 3.

Figure 3:
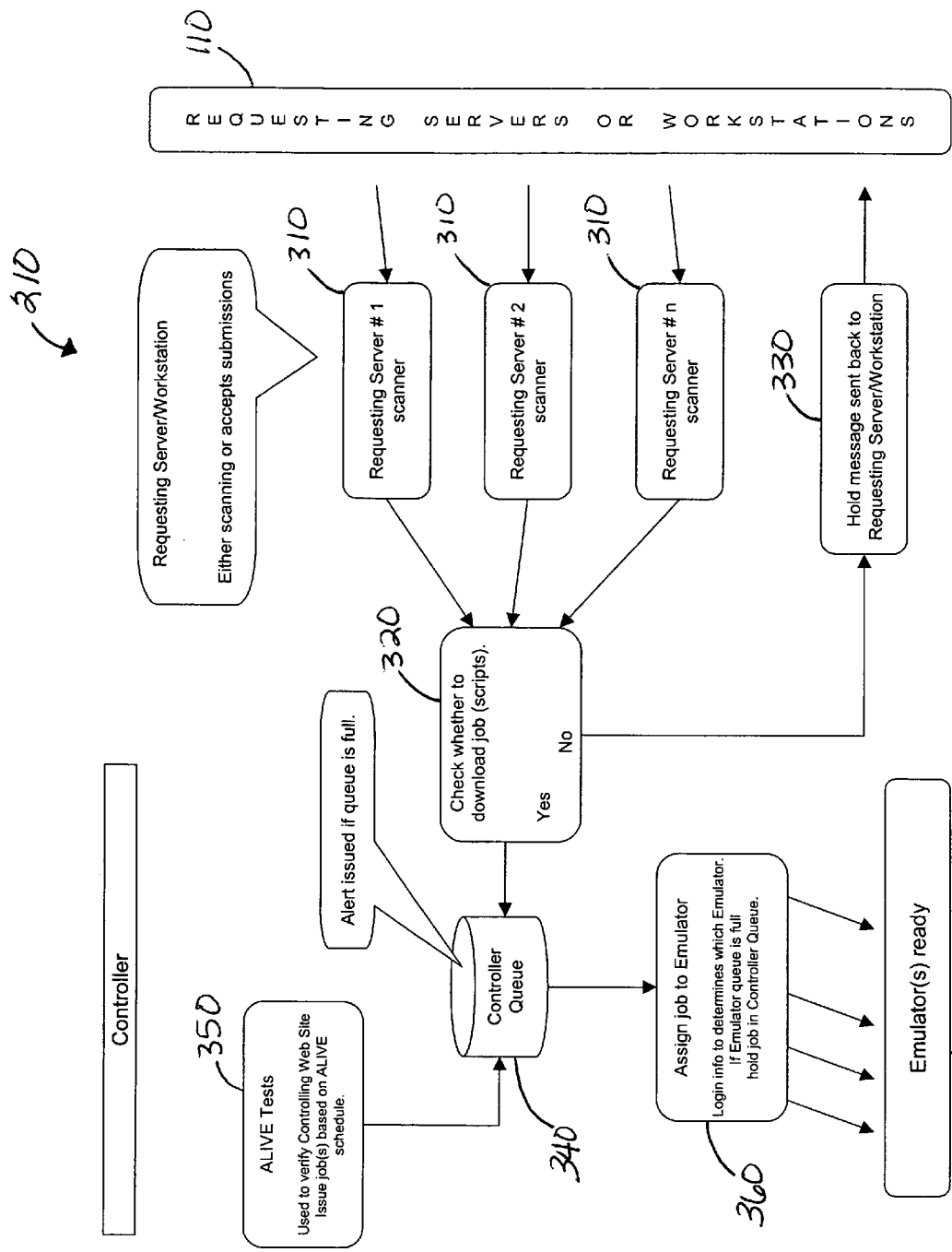
FIG. 3 is a schematic representation of one embodiment of a controller in accordance with the browser control system and method of the present invention.

In one embodiment, at box 310, controller 210 scans requesting server 110 for at least one completed script. If a completed script is available, controller 210 requests, or otherwise obtains, the completed script from requesting server 110. Alternatively, requesting server 110 may send scripts to controller 210 as they are completed, wherein controller 210 may simply accept the submission of the scripts. In some embodiments, as shown in FIG. 3, there may be more than one requesting server 110. Controller 210 may scan, or accept a submission from, each requesting server 110 separately. Any number of requesting servers 110 may be employed with success in accordance with the present invention. In one embodiment, a requesting server 110 is not given preference, or priority, over other requesting servers 110. However, it shall be recognized that giving priority to a requesting server 110, or a subset of a plurality of the requesting servers 110, is contemplated by the system and method of the present invention. Giving priority to a particular requesting server 110 shall generally mean that scripts created by that particular requesting server 110 will be processed generally prior to scripts created by requesting servers 110 with lower priorities.

In a further embodiment, when a completed script becomes available on requesting server 110, controller 210 may determine whether to download or accept submission of the script at step 320. A determination whether to download or accept submission of the script may depend on whether the controlling website on which the script is to be processed is valid, accessible, available, etc., whether the time of submission of the script is outside the scheduled access time for the controlling website, or whether an administrator has put a "hold" on all scripts that use the controlling website. Alternatively, there may be any number of reasons, or combination of reasons, on which controller 210 makes a determination whether to download or accept submission of a script. If controller 210 makes the determination not to download or accept submission of a script, controller 210 sends a response to requesting server 110 to hold the script at box 330. That is, in one embodiment, the script is maintained on requesting server 110 until such time that controller 210 makes a determination to download or accept submission of the script or when a condition causing the script to be held changes or is removed. For example, the controlling website may become available, or the administrator may have removed a hold for the controlling website. Alternatively, requesting server 110 may recreate the script or retry submission of the script, each of which may be done automatically and/or periodically until the script is accepted by controller 210. A plurality of scripts may be waiting on requesting server 110 at any one time, including scripts that have yet to be submitted for a first time and scripts that have been put on hold.

Subsequent to obtaining a completed script from requesting server 110, controller 210 places the script in controller queue 340. Thus, controller queue 340 holds scripts that are ready to be processed by an emulator 220. An alert may be issued if controller queue 340 is full. An alert that controller queue 340 is full may be one of the several reasons, as set forth above, for controller 210 to determine not to download or accept submission of further scripts from requesting server 110. Controller 210 may continue downloading or accepting submission of scripts once controller queue 340 is no longer full. The size of controller queue 340 may be limited by CPU and memory of interface server 130.

Controller 210 manages scripts and assigns them to an available emulator 220. Controller queue 340 may be managed in several manners including, but not limited to, First-In-First-Out (FIFO) and Last-In-First-Out (LIFO) protocols. Alternatively, any controller queue management scheme may be used with the browser control system and method of the present invention. In one embodiment, controller queue 340 may be managed based on priority assigned to the scripts. In another embodiment, controller queue 340 may be managed based on controlling website verification scheduling. More specifically, as described above, each script is to be processed by an emulator at a controlling website specified by the script. Controller 210 may employ verification testing at box 350 on the specified controlling website to determine whether the controlling website is valid, accessible, available, etc. Scripts waiting in controller queue 340 may be scheduled, or assigned to an emulator 220, based on determinations made by the verification testing.

When a script has reached the front of controller queue 340, controller 210 may assign the script to emulator 220. In one embodiment, the script is assigned to the first available emulator 220, the number of available emulators 220 generally being limited only by CPU and memory, as previously discussed. In such a scenario, controller may "start up" an emulator 220, and the emulator 220 will process the script. In an alternate embodiment, controller 210 may assign the script to an emulator 220 that has already been assigned other scripts and/or is currently processing a previously assigned script. Controller 210 may assign more than one script to an emulator 220 for several reasons. For example, a particular emulator 220 may currently be processing scripts for a particular user. When controller 210 assigns a script for the same user, it may assign the new script to the same emulator 220 as the previously assigned script for the same user. Similarly, a particular emulator 220 may currently be processing scripts at a particular controlling website. When controller 210 assigns a script to be processed on the same controlling website, it may assign the new script to the same emulator 220 as the previously assigned script for processing at the same controlling website. It shall be recognized that there are a plurality of reasons that controller 210 may assign a script to an emulator 220 that has already been assigned other scripts and/or is currently processing a previously assigned script, including, but not limited to, efficiency, memory limitations, record keeping, etc.

Emulator

Figure 4:
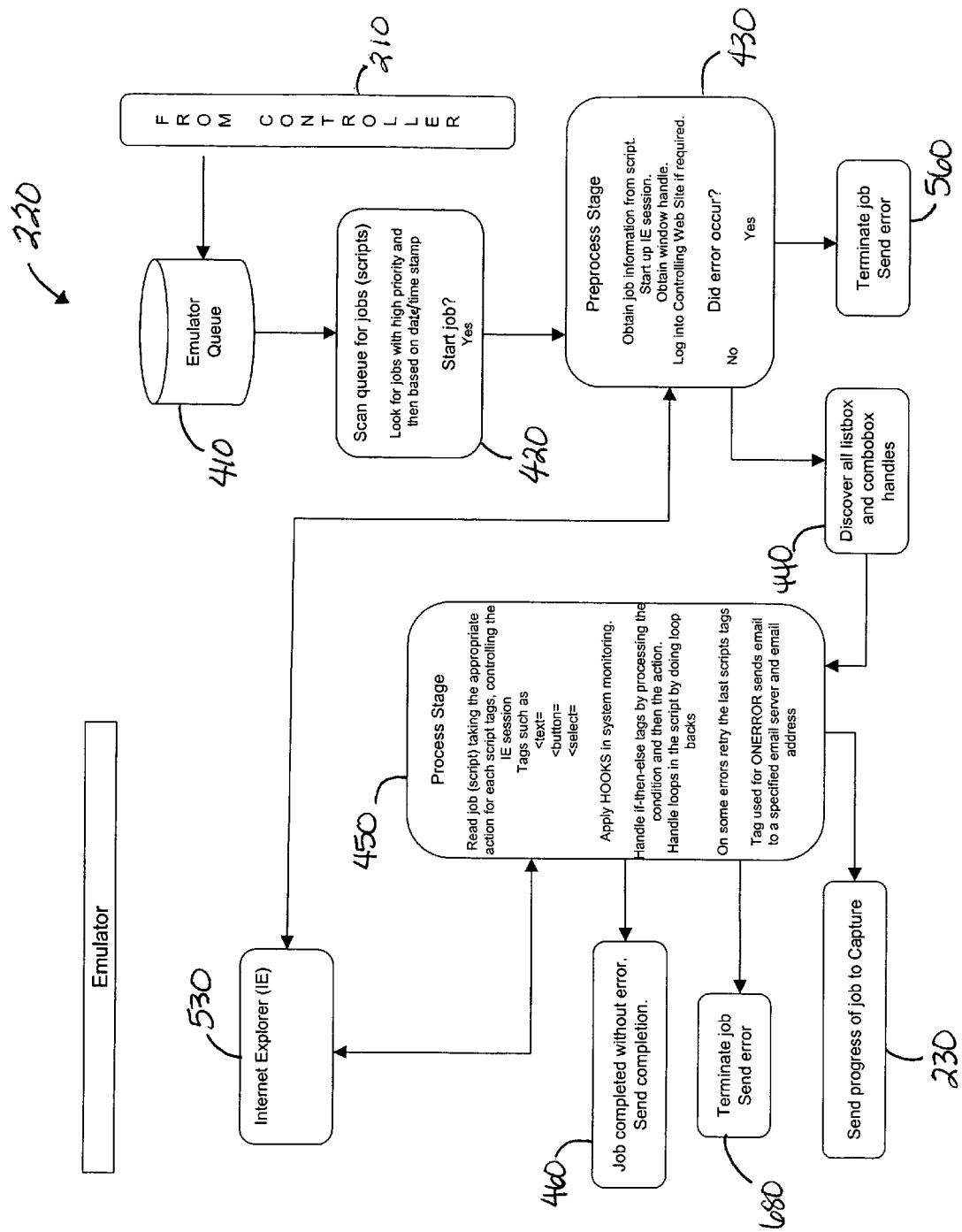
FIG. 4 is a schematic representation of one embodiment of an emulator in accordance with the browser control system and method of the present invention.

Generally, emulator 220 processes a script and intelligently and automatically controls a web browser session. Emulator 220 may communicate with a controlling website and host server 120 through browser objects. As part of controlling a browser session, emulator 220 monitors the browser session and may determine when the browser has finished running, loading, processing, etc. before emulator 220 performs further tasks dictated by the script. In one embodiment, to further aid in control of a browser session, emulator 220 may "hook into" or reach into the operating system. Emulator 220 could then access window handles and use other familiar operating system commands. Exemplary programming code for one embodiment of an emulator of the browser control system and method of the present invention is illustrated in Appendix C. It shall be recognized that an emulator may be programmed in several ways, and the programming code in Appendix C is for illustration purposes only and is not limiting. A detailed embodiment of emulator 220 is described with reference to FIGS. 4 through 6.

Emulator 220 is assigned, and receives, a script from controller 210 as described above. As previously mentioned, several emulators 220 may each process a separate script concurrently. Furthermore, each emulator 220 may communicate with other emulators 220 to aid in control of the browser sessions. The description below relates to the processing of a script by a single emulator 220, but it shall be recognized that the description is applicable to all emulators concurrently processing scripts. Emulator 220 places the script in emulator queue 410. If emulator queue 410 is full, the script may be held in controller queue 340 until emulator queue 410 is no longer full. Each emulator 220 maintains its own emulator queue 410. The size of each emulator queue 340 may be limited by CPU and memory of interface server 130. Emulator queue 410 may be managed in several manners including, but not limited to, First-In-First-Out (FIFO) and Last-In-First-Out (LIFO) protocols. Alternatively, any emulator queue management scheme may be used with the browser control system and method of the present invention. In the embodiment shown in FIG. 4, emulator queue 410 is managed by priority, and then based on date and time stamps. Priority of the script may be assigned by requesting server 110, controller 210, or emulator 220. Priority may be based on, but not limited to, the date the script was created, the deadline required for a response, the importance or confidentiality of the data in the script, the requesting server that created the script, etc.

At box 420, emulator 220 scans emulator queue 410 for available scripts for processing. Emulator 220 receives an available script based on the queue management scheme being used, and the script enters into the preprocess stage at box 430. The preprocess stage 430 may include several steps, including, but not limited to, obtaining script information, starting up a browser session, obtaining the window handle for the browser session, and logging in to the controlling website, etc. As can be seen in the exemplary script in Appendix A and in FIGS. 5 and 6, a script may contain several unique tags. The unique tags provide information useful for and/or necessary to process the script on the controlling website.

Figure 5:
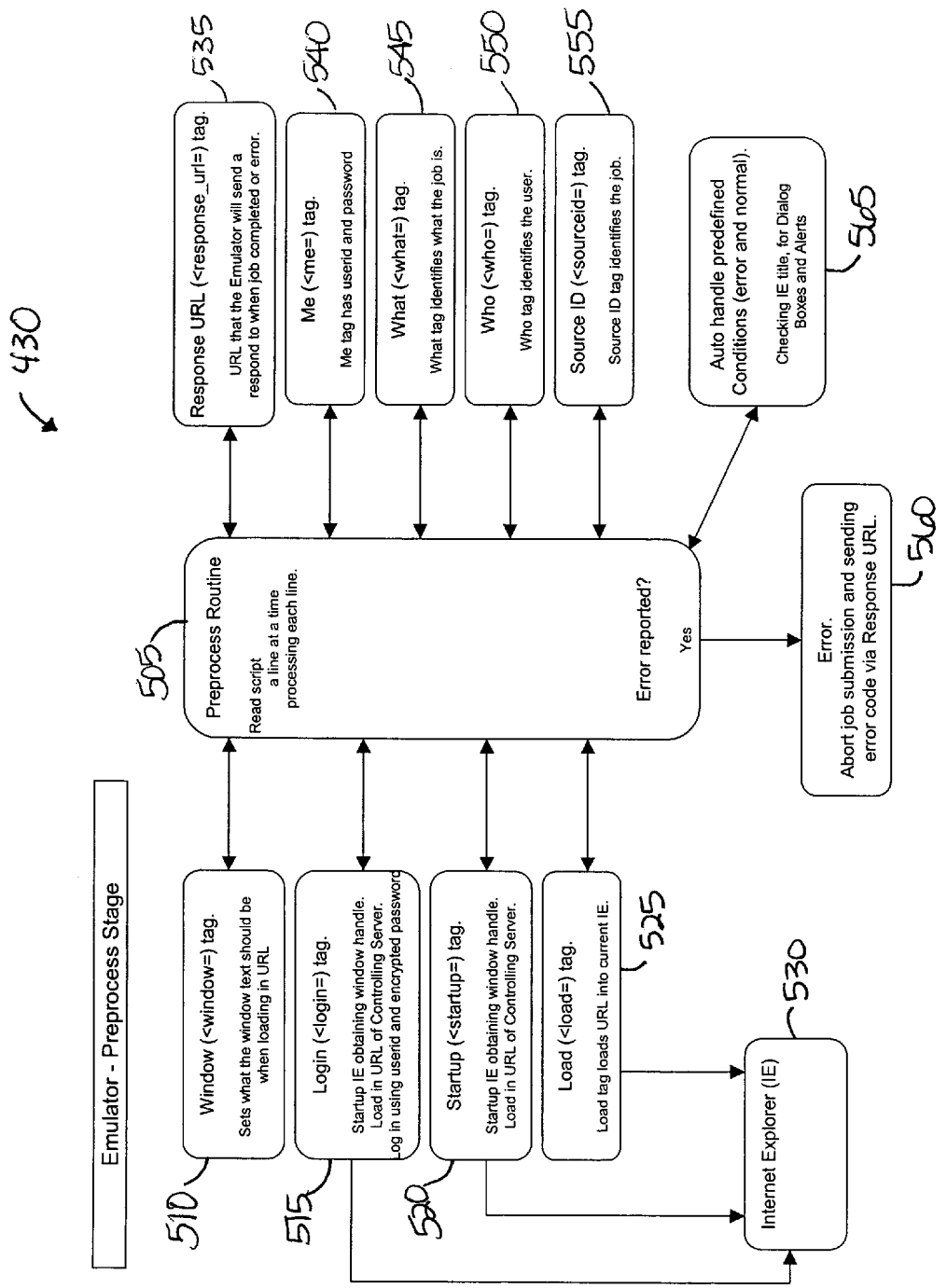
FIG. 5 is a schematic representation of one embodiment of a preprocess stage of an emulator in accordance with the browser control system and method of the present invention.

An exemplary listing of script tags that may be processed during preprocessing can be seen in FIG. 5 and include a Window tag 510, Login tag 515, Startup tag 520, Load tag 525, Response URL tag 535, Me tag 540, What tag 545, Who tag 550, and a Source ID tag 555. A Window tag 510 provides information relating to what the window text should be when loading a particular controlling website in the browser session. A Login tag 515 logs in to the controlling website. A Startup tag 520 causes a browser session to be started and obtains the window handle. A Startup tag 520 may further cause a specified website to load in the opened browser session. Similarly, a Load tag 525 causes a specified website to load in the current browser session. A Response URL tag 535 provides information relating to where the response, if any, will be sent. Typically, the Response URL tag 535 will provide the location of requesting server 110. However, it shall be recognized that the response may be sent to any specified location, including a location other than the location for requesting server 110, host server 120, or interface server 130. A Me tag 540 provides information relating to the user ID and password associated with logging in to a particular website. A What tag 545 generally identifies what task the script will perform. A Who tag 550 identifies the user/requester of the script. A Source ID tag 555 provides information relating to identification of the particular script, such as a script ID.

The unique tags described above comprise an exemplary list of unique tags that may be used with the browser control system and method of the present invention and are not limiting. It shall be recognized that other tags may be used, or the tags identified above may provide information or perform tasks other than those described above. Similarly, it shall be recognized that fewer or greater types of tags may be used in any particular completed script. In one embodiment, there are over 200 tags that may be used.

At preprocess stage 430, preprocess routine 505 reads through the script. When a preprocessing tag (e.g., the tags identified above and in FIG. 5) is read, preprocess routine 505 handles the information or task relating to that tag. For example, when preprocess routine 505 reads a Startup tag 520, preprocess routine 505 will startup a browser session, as seen at block 530. Preprocess routine 505 may further load a website specified in the script in the browser session that was started. Preprocess routine 505 can handle navigation through multiple controlling websites, if so required by host server 120 or the script in order to complete the task. Preprocess routine 505 also determines if there is an error during preprocessing. If an error is determined, processing of the script is aborted, and an error response is sent to the location specified by a Response URL tag 535, as illustrated at box 560. Preprocess routine 505 may also automatically handle certain conditions, at box 565, without instruction from the script, including conditions that are either normal or in error. Conditions that may be handled automatically by preprocessing routine 505 without instruction from the script include, but are not limited to, checking the browser window title, checking for dialog boxes, checking for alerts, and handling "pop-up" windows.

Once preprocessing is completed, the script enters the process stage at box 450. Alternatively, before entering into the process stage 450, emulator 220 may discover all window handles of the controlling website that are listbox and combobox handles at box 440. Emulator 220 may create an array of these window handles in internal memory. These handles are needed in order to control the listboxes and comboboxes and to obtain all the selections of the listboxes or comboboxes. The selection of the listboxes and comboboxes by emulator 220, in one embodiment, is done by using a mix of low level coding (e.g., window handles) and object information (e.g., obtaining all the selections available for each listbox/combobox).

Figure 6:
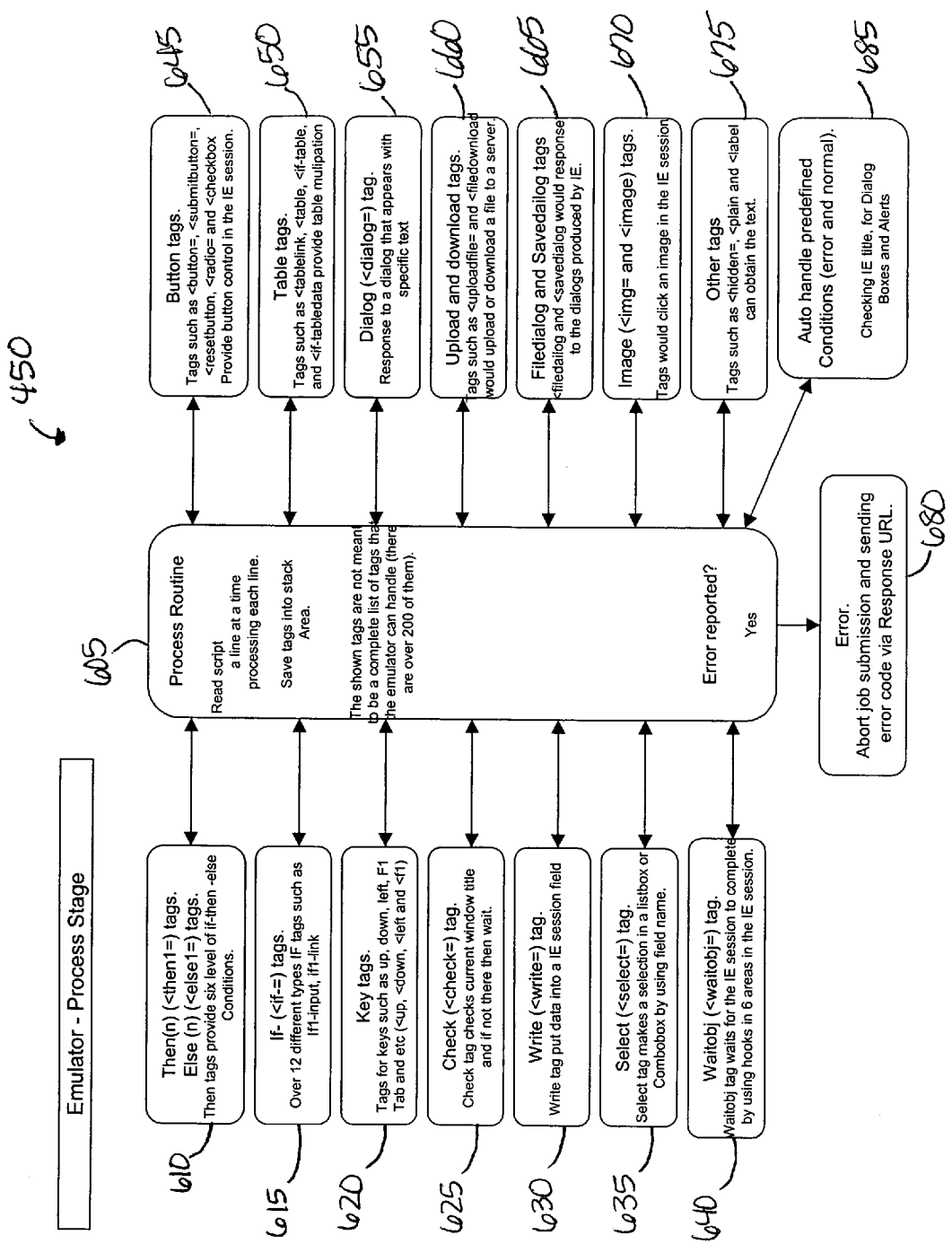
FIG. 6 is a schematic representation of one embodiment of a process stage of an emulator in accordance with the browser control system and method of the present invention.

An exemplary listing of script tags that may be processed during processing can be seen in FIG. 6 and include an If tag 615, with or without a Then tag 610 and/or Else tag 610, a type of key tag 620, a Check tag 625, a Write tag 630, a Select tag 635, a Waitobj tag 640, a type of button tag 645, a type of table tag 650, a Dialog tag 655, a type of upload or download tag 660, a Filedialog tag 665, a Savedialog tag 665, a type of image tag 670, or other familiar tags 675 in the art. If, Then, and Else tags provide for performing certain tasks depending on whether certain conditions are met, as is known in the art. Several different types of If tags 615 are available. In one embodiment, emulator 220 has the ability to process "if-then" and "if-then-else" statements and looping constructs. In a further embodiment, other familiar programming constructs may be used in accordance with the browser control system and method of the present invention. A key tag 620 relates to a key that may be pressed on a computer keyboard/keypad, such as "up," "down," "left," "right," "F1," "Tab," etc. Emulator 220 may emulate the pressing of the specified key. A Check tag 625 checks the title of the current browser session window. If a title is not there, processing may wait until a title is available. A Write tag 630 places data into a browser field, such as a text field. A Select tag 635 makes a selection in a listbox or combobox. Necessary listbox and combobox information may be obtained as described with reference to box 440 in FIG. 4. A Waitobj 640 tag waits for the browser session to complete. A button tag 645, such as Button, Submitbutton, Resetbutton, Radio, and Checkbox, provides button control in the browser session. Similarly, a table tag 650, such as Tablelink, Table, If-table, and If-tabledata provides table manipulation in the browser session. A Dialog tag 655 responds to a dialog that appears in the browser session with specified text. An upload tag 660, such as Uploadfile, uploads a data item or file to a specified location. Similarly, a download tag 660, such as Filedownload, downloads a data item or file to a specified location. A Filedialog or Savedialog tag 665 responds to dialogs produced by the browser session. An image tag 670, such as IMG or Image, clicks on an image in the browser session. Other tags 675 may be provided or created to perform other tasks. For example, tags such as Hidden, Plain, and Label can obtain text in the browser session. Similarly, a tag may be provided for handling "pop-up" windows. Alternatively, "pop-up" windows may be handled automatically by emulator 220 without instruction by the script, as described below.

The unique tags described above are an exemplary list of unique tags that may be used with the browser control system and method of the present invention and are not limiting. It shall be recognized that other tags may be used or the tags identified above may provide information or perform tasks other than those described above. Similarly, it shall be recognized that fewer or greater types of unique tags may be used in any particular completed script. In one embodiment, there are over 200 tags that may be used.

At process stage 450, process routine 605 reads through the script. When a processing tag (e.g., the tags identified above and in FIG. 6) is read, process routine 605 handles the information or task relating to that tag. For example, when process routine 605 reads a key tag, process routine 605 will emulate the pressing of a particular key, specified by the tag, on a computer keyboard. Process routine 605 can handle navigation through multiple controlling websites, if so required by host server 120 or the script in order to complete the task. Process routine 605 also determines if there is an error during processing. If an error is determined, processing of the script is aborted and an error response is sent to the location specified by a Response URL tag 535, as illustrated at box 680. Process routine 605 may also automatically handle certain conditions, at box 685, without instruction from the script, including conditions that are either normal or in error. Conditions that may be handled automatically by processing routine 605 without instruction from the script include, but are not limited to, checking the browser window title, checking for dialog boxes, checking for alerts, and handling "pop-up" windows.

With reference back to FIG. 4, after completion of processing the script, a response may be returned from emulator 220 specifying the script was processed without error, as shown at box 460. Alternatively, or additionally, a specific response may be sent back to a specified location, depending on the script task that was performed. For example, if the task performed by processing the script was an order submission, the response may include an order confirmation number. Similarly, if the task performed by processing the script was a parts list request, the response may include the parts list that was received after making the request. It shall be recognized that each script may perform a task associated with an appropriate response, and any information relating to that response may be sent in a response from emulator 220. The response is sent to the location specified by a Response URL tag 535. Typically, the Response URL tag 535 will provide the location of requesting server 110. However, it shall be recognized that the response may be sent to any specified location, including a location other than the location for requesting server 110, host server 120, or interface server 130.

After a response is sent, or in the case where an error terminates the processing of a script, emulator 220 may retrieve another script from emulator queue 410 based on the queue management scheme, as described above. The preprocessing and processing of the new script is accomplished in the same manner as just described. Alternatively, where no scripts are available in emulator queue 410, emulator 220 may be closed.

Although the present invention has been described with reference to preferred embodiments, persons skilled in the art will recognize that changes may be made in form and detail without departing from the spirit and scope of the invention. For example, although emulator 220 has been described and illustrated in separate parts, i.e., preprocess stage 430, process stage 450, etc., it shall be recognized that in alternative embodiments, emulator 220 can provide for processing in a fewer or greater number of stages, including processing in a single stage. In other words, separate stages of processing are not a necessary limitation of the present invention, and the description merely discloses one embodiment of a browser control system and method of the present invention.

I claim:

1. A method for controlling a web browser session, comprising: providing a controller on an interface server;
receiving at the controller, from a requesting server, at least one script, the at least one script comprising a plurality of unique tags, which comprise instructions for performing a task at a controlling website of a host server specified in the script;
managing the at least one script, wherein managing the at least one script includes comprises assigning the at least one script to an emulator on the interface server; and
processing the at least one script with the emulator by executing the instructions utilizing a web browser session on the interface server to communicate with the host server, wherein processing the at least one script with the emulator comprises starting up the web browser session on the interface server, loading the controlling website of the host server, processing the plurality of unique tags at the controlling website, and sending a response to a location specified by the script.

2. The method of claim 1, wherein managing the at least one script further comprises placing the script in a controller queue on the interface server, the controller queue operable to contain a plurality of scripts.

3. The method of claim 1, wherein the at least one script comprises at plurality of scripts, and assigning the at least one script to an emulator comprises assigning the plurality of scripts to a plurality of emulators, each of the plurality of emulators receiving one or more of the plurality of scripts.

4. The method of claim 3, wherein each of the plurality of emulators is operable to process one of the plurality of scripts at the same time another of the plurality of emulators processes a different one of the plurality of scripts.

5. The method of claim 1, wherein managing the at least one script further comprises determining the order in which to assign the at least one script to an emulator.

6. The method of claim 5, wherein determining the order in which to assign the at least one script to an emulator is based on whether the controlling website of the host server specified in the at least one script is at least one of the statuses of valid, available, and accessible.

7. The method of claim 1, wherein processing the at least one script with the emulator comprises processing the plurality of unique tags at the controlling website of the host server specified by the script.

8. The method of claim 7, wherein processing the at least one script with the emulator further comprises accessing operating system controls at the location of the controlling website.

9. The method of claim 8, wherein accessing operating system controls comprises accessing window handle information.

10. A method for automatic web browser control, comprising:
creating a script of instructions for controlling a browser session using a script template and user data, the script template comprising a set of instructions for performing a task at a controlling website of a host server specified by the script and the user data comprising user information necessary to complete the task;
providing the script to a controlling system, wherein the controlling system is operable has the ability to manage a plurality of scripts;
assigning the script to a browser control engine, wherein the browser control engine processes the script by processing utilizing the browser session to process a plurality of unique tags contained in the script to execute the instructions at the controlling website, wherein processing the plurality of unique tags contained in the script comprises starting up the browser session, loading the controlling website, and performing actions at the controlling website based on the plurality of unique tags; and
sending a response to location specified by the script.

11. The method of claim 10, wherein the browser control engine accesses operating system controls of the controlling website specified by the script during the processing of the script.

12. The method of claim 11, wherein the browser control engine accesses window handle information.

13. A system for intelligent control of a web browser session, comprising:
at least one emulating engine operable to utilize a web browser session to execute instructions, contained in a plurality of unique tags in a script, to perform a task at a controlling website of a host server specified in the script, the at least one emulating engine comprising an emulator queue operable to hold a plurality of scripts for processing by the at least one emulating engine for automatic control of a web browser session in response to the processing of a script;
a controlling engine operable to receive for receiving a plurality of scripts and managing manage the distribution of the plurality of scripts for processing by the at least one emulating engine; and
at least one requesting server, the at least one requesting server comprising a plurality of script templates for creating the script.

14. The system of claim 13, further comprising at least one requesting workstation and an interface workstation, the interface workstation comprising the controlling engine and the at least one emulating engine.

15. The system of claim 13, wherein the at least one requesting server creates the script for sending to the controlling engine.

16. The system of claim 13, wherein the controlling engine comprises a controller queue operable to hold a plurality of scripts for distributing to the at least one emulating engine.

* * * * *